United States Patent
Li et al.

(10) Patent No.: US 11,888,330 B2
(45) Date of Patent: Jan. 30, 2024

(54) WIRELESS CHARGING TRANSMITTING APPARATUS AND METHOD THEREOF

(71) Applicant: Delta Electronics (Shanghai) Co.,Ltd., Shanghai (CN)

(72) Inventors: Bin Li, Shanghai (CN); Yayu Li, Shanghai (CN); Shengyi Yang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/806,503

(22) Filed: Jun. 13, 2022

(65) Prior Publication Data
US 2023/0016047 A1  Jan. 19, 2023

(30) Foreign Application Priority Data
Jul. 15, 2021 (CN) .......................... 202110799110.9

(51) Int. Cl.
| | |
|---|---|
| *H02J 50/80* | (2016.01) |
| *H02J 50/00* | (2016.01) |
| *H02J 50/10* | (2016.01) |

(52) U.S. Cl.
CPC ............ *H02J 50/80* (2016.02); *H02J 50/005* (2020.01); *H02J 50/10* (2016.02)

(58) Field of Classification Search
CPC .......... H02J 50/80; H02J 50/005; H02J 50/10; H02J 50/402
See application file for complete search history.

(56) References Cited

U.S. PATENT DOCUMENTS

| | | | | |
|---|---|---|---|---|
| 2018/0052649 | A1* | 2/2018 | Patel | H02J 50/10 |
| 2020/0076242 | A1* | 3/2020 | Narayana Bhat | H02J 50/90 |
| 2021/0152030 | A1* | 5/2021 | Byun | H01F 38/14 |

FOREIGN PATENT DOCUMENTS

| | | |
|---|---|---|
| CN | 108390463 A | 8/2018 |
| CN | 111884296 A | 11/2020 |
| CN | 112421789 A | 2/2021 |

* cited by examiner

*Primary Examiner* — Jeffrey M Shin
(74) *Attorney, Agent, or Firm* — CKC & Partners Co., LLC

(57) ABSTRACT

The present application provides a wireless charging transmitting apparatus, comprising: a charging module comprising a charging coil; a plurality of electromagnet units arranged around the charging coil to form an electromagnet array; and a control unit for acquiring state information of a charging receiving apparatus, generating configuration information of the respective electromagnet units, and activating and configuring the electromagnet units to be a magnetic structure matched with the charging receiving apparatus, and the control unit controlling the charging module. The application further provides a method for controlling charging using the wireless charging transmitting apparatus. According to the embodiments of the application, the wireless charging transmitting apparatus is effectively compatible with and adapted to various types of charging receiving apparatuses by configuring the electromagnet units according to the state information of the charging receiving apparatus.

14 Claims, 4 Drawing Sheets

WIRELESS CHARGING TRANSMITTING APPARATUS AND METHOD THEREOF

CROSS-REFERENCE TO RELATED APPLICATIONS

This non-provisional application claims priority under 35 U.S.C. § 119(a) on Patent Application No. 202110799110.9 filed in P.R. China on Jul. 15, 2021, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

BACKGROUND OF THE INVENTION

1. Field of the Invention

The present application relates to the field of wireless charging technologies, and particularly to a wireless charging transmitting apparatus and a method for controlling charging using the same.

2. Related Art

Currently, wireless charging devices have negative charging feeling such as charging dead zone, poor communication quality and low efficiency due to influence of coupling effect between charging coils. With development of the wireless charging technology, there are higher requirements for charging performance and user experience, so the magnetic type wireless charging technology becomes a hot spot in research and application.

The existing magnetic type wireless charging transmitting apparatus uses magnets as a magnetic structure, but shape and size of such structure are fixed, a charging transmitting apparatus is only adaptable to a charging receiving apparatus, and flexibility is poor. In the prior art, accurate location and pairing between mobile phones and wireless chargers are realized using such as a magnetic ring formed by thirty-six magnets in an alternative arrangement, and a wireless charging state with higher efficiency is entered, as shown in FIG. 1, but only specific magnetic type wireless charging mobile phones are supported, and compatibility and adaptability are incapable when facing various other wireless charging receiving apparatuses.

Therefore, based on the problem of poor adaptability of the existing wireless charging transmitting apparatus, a new wireless charging transmitting apparatus shall be provided.

SUMMARY OF THE INVENTION

Under such background, one aspect of the disclosure is to provide a wireless charging transmitting apparatus, which can be effectively compatible with and adapted to charging receiving apparatuses with various types of magnetic type structures based on wireless charging technology.

Another aspect of the disclosure is to provide a method for controlling charging using the wireless charging transmitting apparatus, which controls charging of the charging receiving apparatuses through the wireless charging transmitting apparatus.

According to one aspect of the disclosure, provided is a wireless charging transmitting apparatus, comprising:
a charging module comprising a charging coil;
a plurality of electromagnet units arranged around the charging coil to form an electromagnet array; and
a control unit for acquiring state information of a charging receiving apparatus, generating configuration information of the respective electromagnet units, and activating and configuring the electromagnet units to be a magnetic structure matched with the charging receiving apparatus, and the control unit controlling the charging module.

Optionally,
the state information of the charging receiving apparatus comprises at least one of quality information, position information, shape information, model information and magnetic information;
the configuration information of the respective electromagnet units is generated according to at least one of quality information, position information, shape information, model information and magnetic information.

Optionally,
the configuration information of the electromagnet units comprises information of polarities and magnetic field intensities of the electromagnet units.

Optionally,
the control unit comprises:
a master control module for acquiring at least one of quality information, position information, shape information, model information and magnetic information of the charging receiving apparatus; and
an electromagnet array control module connected to the master control module for receiving at least one of quality information, position information, shape information, model information and magnetic information of the charging receiving apparatus, and activating and configuring the electromagnet units to be a magnetic structure matched with the charging receiving apparatus.

Optionally,
the position information is dynamic information;
the magnetic structure is controlled to be fixed, and the position information of the charging receiving apparatus is dynamically adjusted according to the configuration information of the electromagnet units, such that the charging receiving apparatus moves towards the charging coil.

Optionally,
the magnetic structure is dynamically adjusted, such that the charging receiving apparatus moves towards the charging coil.

Optionally,
the activated electromagnet units are annularly arranged around the charging coil.

Optionally,
the activated electromagnet units are discretely arranged around the charging coil.

Optionally,
the charging coil is a plurality of coils or a single coil.

Optionally,
the control unit acquires the state information of the charging receiving apparatus via wireless communication protocol or a dial switch or a man-machine interface.

According to another aspect of the disclosure, provided is a method for controlling charging through a wireless charging transmitting apparatus, comprising:

arranging a plurality of electromagnet units around a charging coil to form an electromagnet array; and acquiring state information of a charging receiving apparatus, generating configuration information of the respective electromagnet units, and activating and configuring the electromagnet units to be a magnetic structure matched with the charging receiving apparatus.

Optionally, the state information of the charging receiving apparatus comprises at least one of quality information, position information, shape information, model information and magnetic information;

the configuration information of the respective electromagnet units is generated according to at least one of quality information, position information, shape information, model information and magnetic information.

Optionally, the position information is dynamic information;

the method further comprises:

controlling the magnetic structure to be fixed, and dynamically adjusting the position information of the charging receiving apparatus according to the configuration information of the electromagnet units, such that the charging receiving apparatus moves towards the charging coil.

Optionally, the method further comprises:

dynamically adjusting the magnetic structure, such that the charging receiving apparatus moves towards the charging coil.

The above embodiments can provide a wireless charging transmitting apparatus, and with respect to the problem of incapable of compatibility and adaptability of the existing magnetic type wireless charging transmitting apparatus, an electromagnet array is formed by arranging a plurality of electromagnet units around a charging coil, and a control unit generates configuration information of the respective electromagnet units, according to the acquired state information of a charging receiving apparatus, and activates and configures the electromagnet units to be a magnetic structure matched with the charging receiving apparatus. The wireless charging transmitter generates information of polarities and magnetic field intensities of the respective electromagnet units according to at least one of quality information, position information, shape information, model information and magnetic information of the different charging receiving apparatuses, and can activate and configure the electromagnet units to be the magnetic structure matched with the charging receiving apparatus by reasonably configuring polarities and magnetic forces of the respective electromagnet units, so as to be effectively compatible with and adapted to various charging receiving apparatuses.

BRIEF DESCRIPTION OF THE DRAWINGS

The above and other objects, features and advantages of the disclosure become more apparent according to detailed descriptions with reference to the accompanying drawings, wherein.

DETAILED EMBODIMENTS OF THE INVENTION

Figure 1:
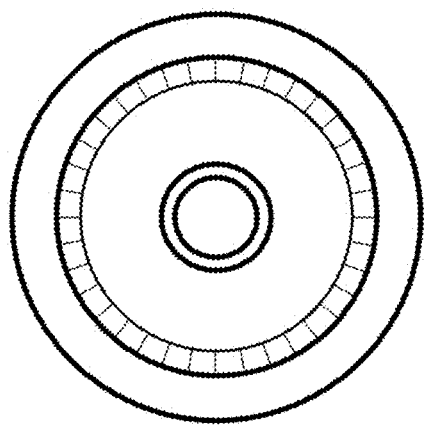
FIG. 1 is a structural diagram of a charging receiving apparatus in the prior art.

To make objects, technical solutions and advantages of the invention clearer, hereinafter the invention is further explained in details with reference to the accompanying drawings and embodiments. It shall be understood that the detailed embodiments described here are only to explain the invention, not limiting the invention.

It shall be noted that when the specification specifies reference signs for elements in the drawings, although the same reference sign is shown in different drawings, the same reference sign represents the same element as could as possible. In addition, in the below description of the disclosure, when detailed descriptions of the known functions and constructions incorporated into the invention make the subject matter of the disclosure quite unclear, the detailed descriptions will be omitted.

Further, when the elements in the disclosure are described, terms such as "first", "second", "A", "B", "(a)", "(b)" and the like may be used. These terms are only to distinguish one element from other elements, and essence, order, sequence, or number of the corresponding element is not limited thereto. When one element is described to be "connected to", "coupled to" or "linked to" another element, it shall be understood that one element can be directly connected or coupled to another element, and also can be "connected to", "coupled to" or "linked to" another element via a third element, or the third element may be interposed between one element and another element.

Still further, with respect to citation of "one embodiment", "embodiments", "exemplary embodiment", or the like, it refers to that the described embodiment may include specific features, structures or characteristics, not that each embodiment must include these specific features, structures or characteristics. In addition, such expression does not refer to the same embodiment. Further, when the specific features, structures or characteristics are described combining with the embodiments, no matter whether they are clearly described, it has indicated that combination of these features, structures or characteristics into other embodiments is within the scope of knowledge of those skilled in the art.

Even further, the specification and subsequent claims use certain phrases to name specific components or parts, and those ordinary in the art shall understood that manufacturers can use different nouns or terms to call the same component or part. The specification and subsequent claims do not distinguish the components or parts with difference of names, but difference in functions as distinguishing criterion. In the whole specification and subsequent claims, "comprise" and "include" mentioned are open words, so they shall be explained to "include but not limited to". Moreover, the word "connect" includes any direct or indirect electrical connection means. Indirect electrical connection means includes connection through other devices.

Figure 2:
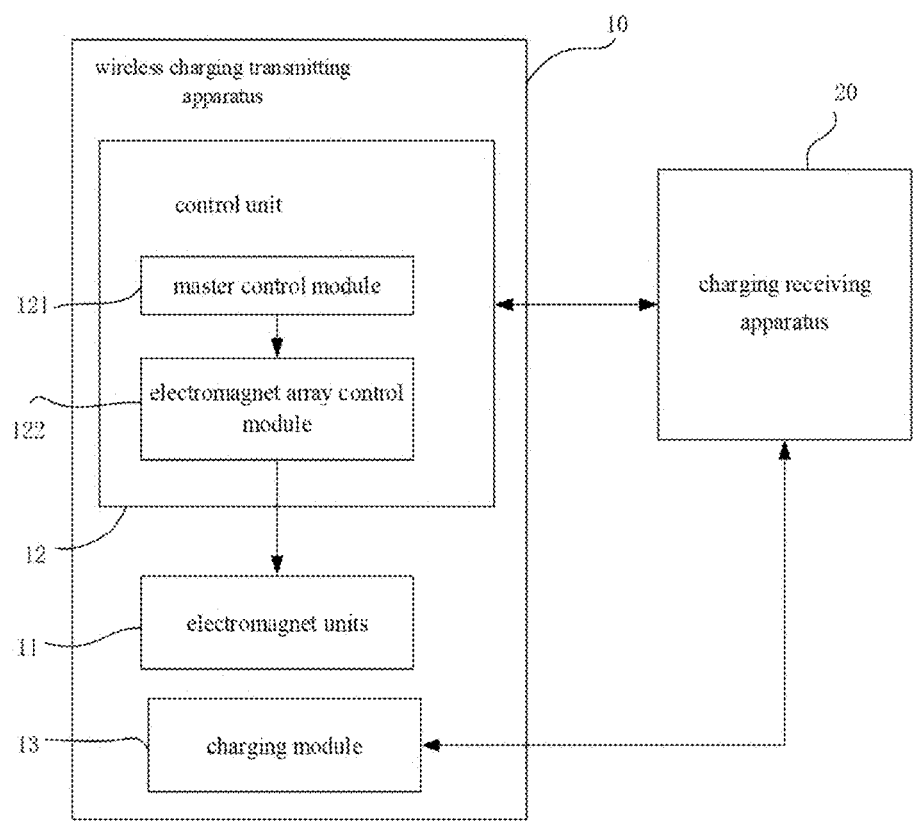
FIG. 2 is a structural block diagram of a wireless charging receiving apparatus in the application.
Figure 3:
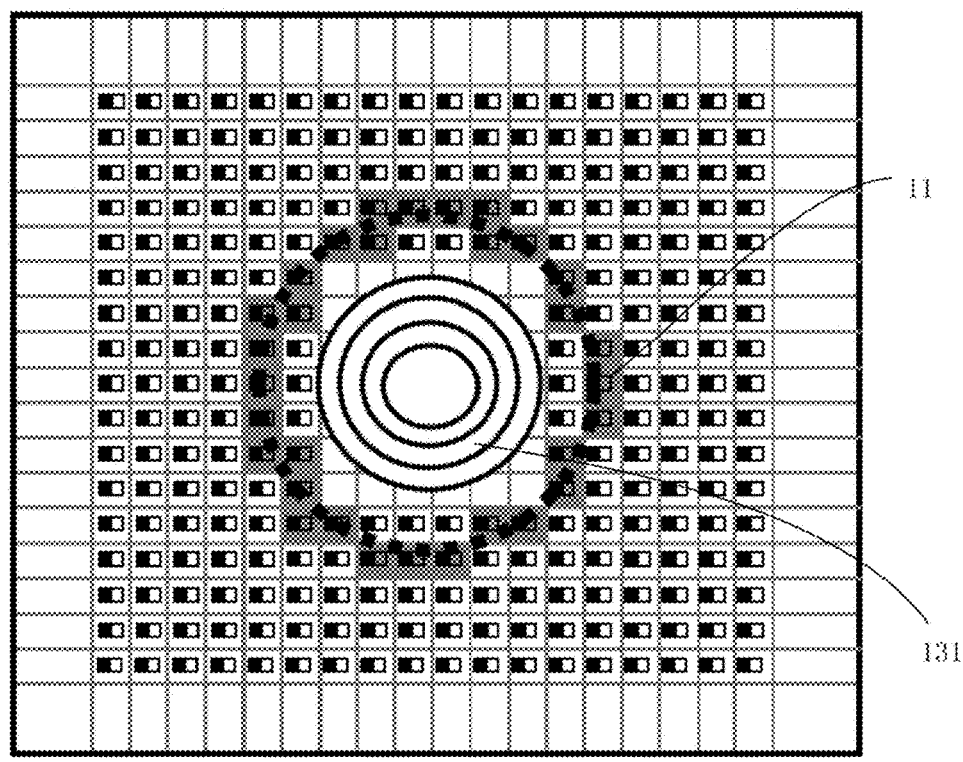
FIG. 3 is a schematic diagram of matching in an annular magnetic manner.

FIG. 2 is a schematic configuration block diagram of a wireless charging transmitting apparatus according to an embodiment of the disclosure.

As an example, FIG. 2 illustrates a wireless charging transmitting apparatus 10, which may be flexibly configured with and effectively adapted to a magnetic wireless charging receiving apparatus in any form.

Referring to FIG. 2, the wireless charging transmitting apparatus 10 comprises a plurality of electromagnet units 11, a control unit 12 and a charging module 13, wherein, the charging module 13 comprises a charging coil 131;

the plurality of electromagnet units 11 are arranged around the charging coil 131 to form an electromagnet array; and the control unit 12 acquires state information of a charging receiving apparatus 20, generates configuration information of the respective electromagnet units, and activates and configures the electromagnet units to be a magnetic structure matched with the charging receiving apparatus, and the control unit 12 controls the charging module 13.

As is stated previously, in relevant technology, the existing magnetic wireless charging transmitting apparatus is only adaptable to a charging receiving apparatus, and cannot be compatible and adapted, so flexibility is poor.

However, in the embodiment of the application, based on the magnetic wireless charging technology, an electromagnet array is formed by arranging a plurality of electromagnet units 11 around a charging coil 131, and a control unit 12 acquires state information of a charging receiving apparatus 20, generates configuration information of the respective electromagnet units, and activates and configures the electromagnet units to be a magnetic structure matched with the charging receiving apparatus, the charging transmitting apparatus can be effectively compatible with and adapted to various types of charging receiving apparatuses.

In specific implementation, communication mode between the wireless charging transmitting apparatus and the charging receiving apparatus in this embodiment is flexible, and the control unit can acquire the state information of the charging receiving apparatus via wireless communication protocol or a dial switch or a man-machine interface. Particular configuration can be made according to needs, but this embodiment is not limited thereto.

Meanwhile, in this embodiment, the state information of the charging receiving apparatus comprises at least one of quality information, position information, shape information, model information and magnetic information, the configuration information of the electromagnet units comprises information of polarities and magnetic field intensities of the electromagnet units, and the configuration information of the electromagnet units is generated based on the state information of the different charging receiving apparatuses. That is, the information of polarities and magnetic field intensities of the electromagnet units is generated according to at least one of quality information, position information, shape information, model information and magnetic information of the different charging receiving apparatuses, and the electromagnet units can be activated and configured to be the magnetic structure matched with the charging receiving apparatus by reasonably configuring polarities and magnetic forces of the respective electromagnet units, so as to be effectively compatible with and adapted to various charging receiving apparatuses. The information contained in the state information of the charging receiving apparatus also may be particularly configured according to needs, but this embodiment is not limited thereto.

Further, as shown in FIG. 2, in specific implementation, as for the control unit 12, it may be divided into a master control module 121 and an electromagnet array control module 122, i.e., master control function and electromagnet array control function are divided to be a master control chip and an electromagnet array control chip, or master control function and electromagnet array control function are integrated to be a master control chip, but the application is not limited thereto.

In some embodiments, the control unit 12 particularly comprises:

a master control module 121 acquiring quality information, position information, and magnetic information of the charging receiving apparatus; and an electromagnet array control module 122 connected to the master control module 121 for receiving at least one of quality information, position information, shape information, model information and magnetic information of the charging receiving apparatus, and activating and configuring the electromagnet units to be a magnetic structure matched with the charging receiving apparatus.

Meanwhile, in specific implementation, as for a control process of the control unit 12 of acquiring the state information of the charging receiving apparatus 20, generating the configuration information of the respective electromagnet units, and activating and configuring the electromagnet units to be a magnetic structure matched with the charging receiving apparatus, can start the magnetic structure by configuring a magnetic force of the electromagnet units when the charging receiving apparatus has deviation in location, and control movement of dynamic position of the charging receiving apparatus 20 on the wireless charging transmitting apparatus 10, or dynamically adjust position of the magnetic structure. In particular, Since position of the charging coil is fixed, the charging receiving apparatus shall be aligned with the charging coil. The activated electromagnets can be selected, and the magnetic field intensity and direction of the electromagnets can be adjusted, such that the charging receiving apparatus moves towards the charging coil. Therefore, in some embodiments, the position information is dynamic information; the magnetic structure is controlled to be fixed, and the position information of the charging receiving apparatus is dynamically adjusted according to the configuration information of the electromagnet units, such that the charging receiving apparatus moves towards the charging coil. Alternatively, in some other embodiments, the magnetic structure is dynamically adjusted, such that the charging receiving apparatus moves towards the charging coil.

Therefore, in this embodiment, if the position information is dynamic information, the magnetic structure can be controlled to be fixed, and the position information of the charging receiving apparatus can be dynamically adjusted according to the configuration information of the electromagnet units, such that the charging receiving apparatus moves towards the charging coil. That is, when the charging receiving apparatus is placed at any position of a charging board of the wireless charging apparatus, the magnetic structure can be started by reasonably configuring a magnetic force of the electromagnet units when the charging receiving apparatus has deviation in location, thereby dynamically adjusting the position of the charging receiving apparatus to reduce power consumption. Meanwhile, the charging receiving apparatus moves towards the charging coil by dynamically adjusting the magnetic structure.

Figure 4:
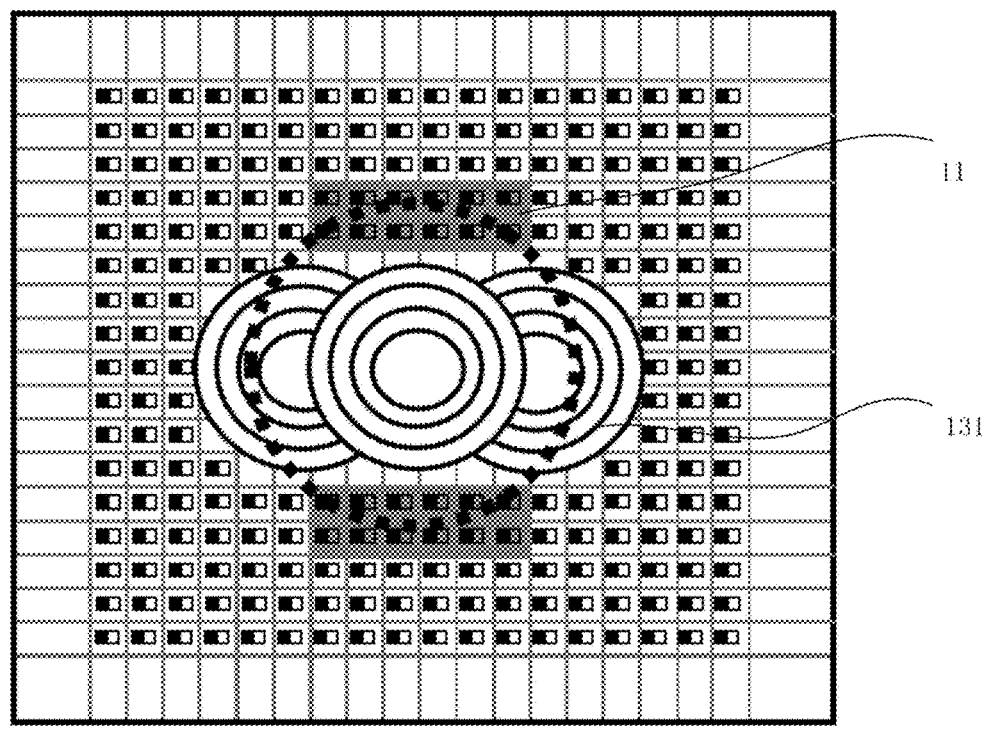
FIGS. 4 to 6 are schematic diagrams of matching in an annular magnetic manner when a charging coil comprises a plurality of coils.
Figure 5:
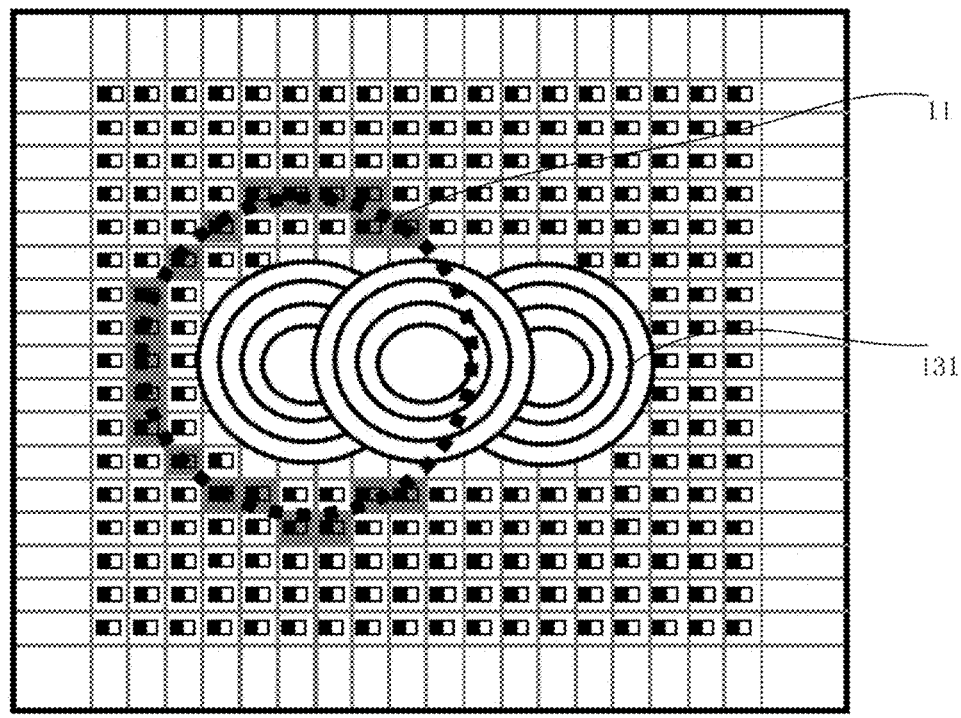
Figure 6:
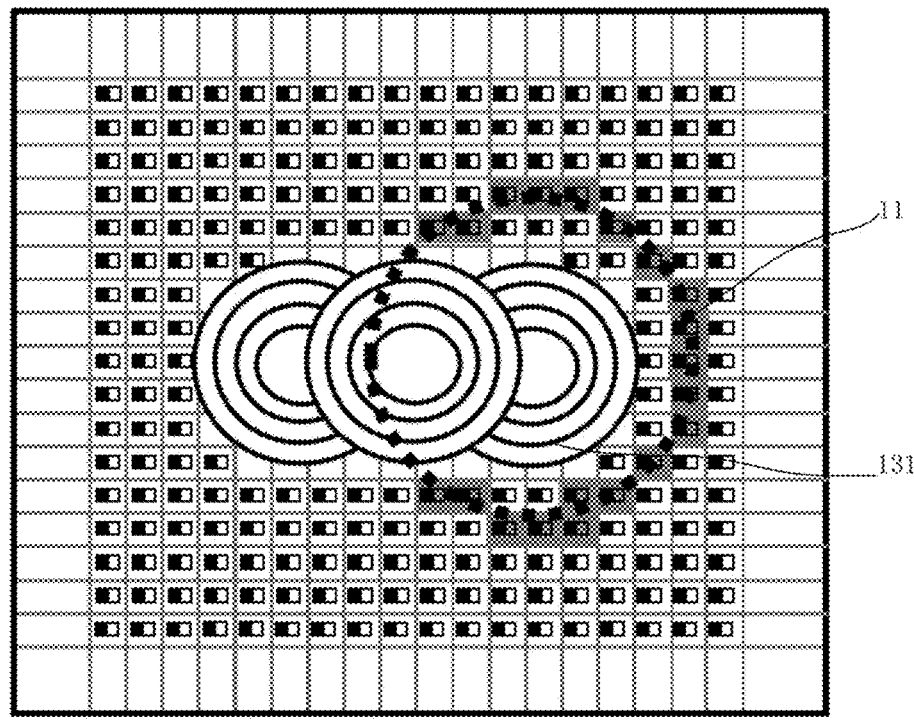
Figure 7:
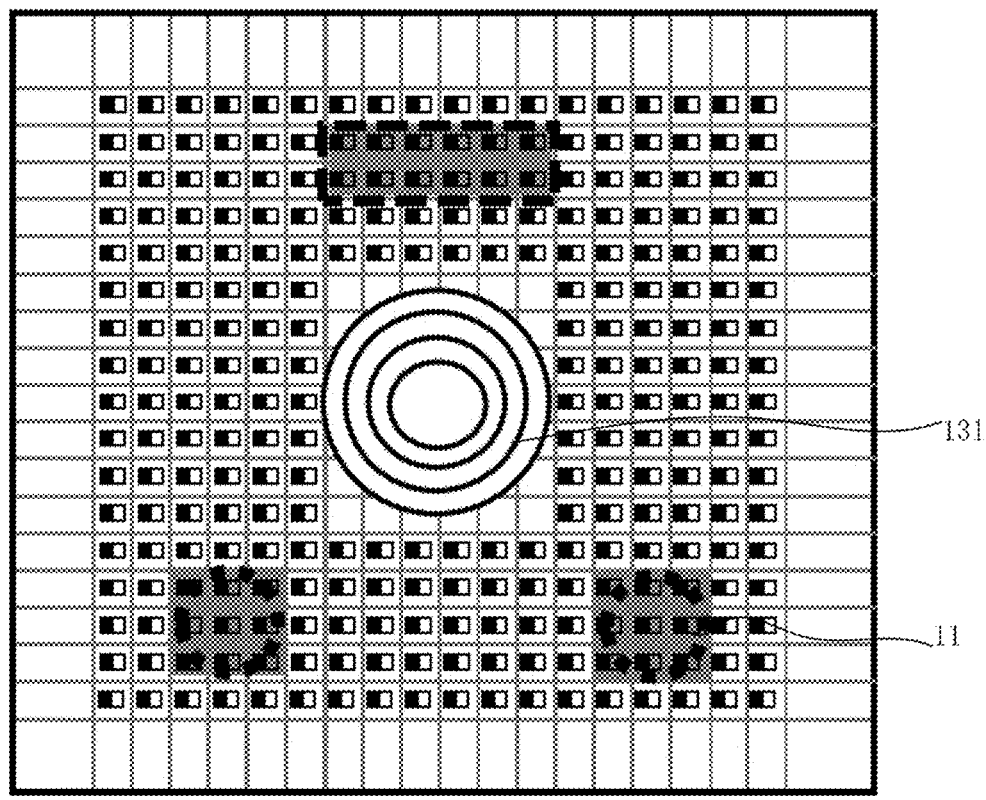
FIG. 7 is a schematic diagram of matching in a discrete magnetic manner.

Meanwhile, in specific implementation, as for arrangement of the activated electromagnet units in the charging coil, the electromagnet units to be activated can be selected, and shape and position of the magnetic structure can be adjusted according to the state information of the charging receiving apparatus 20. FIGS. 3 to 6 illustrate schematic diagrams of matching in an annular magnetic manner, and at this time, the activated electromagnet units are annularly arranged around the charging coil which in an operating state. In actual design, the charging coil 131 can be a plurality of coils. FIGS. 4 to 6 illustrate schematic diagrams of matching in an annular magnetic manner when the charging coil is a plurality of coils, and at this time, the activated electromagnet units 11 are annularly arranged on one side of the charging coil 131 in operation. For example, FIG. 4 shows that the middle charging coil is in an operating state, and at this time, the activated electromagnet units 11 are arranged on both sides of the middle charging coil 131; FIG. 5 shows that the left charging coil 131 is in an operating state, and at this time, the activated electromagnet units 11 are arranged on one side of the left charging coil 131; FIG. 6 shows that the right charging coil 131 is in an operating state, and at this time, the activated electromagnet units 11 are arranged on one side of the right charging coil 131. FIG. 7 illustrates a schematic diagram of matching in a discrete magnetic manner, and at this time, the activated electromagnet units 11 are discretely arranged around the charging coil 131 which in an operating state.

The wireless charging transmitting apparatus can annularly or discretely distribute the electromagnet units around the charging coil in an operating state, and dynamically adjust the position information of the charging receiving apparatus according to the configuration information of the electromagnet units, such that the charging receiving apparatus moves towards the charging coil, or dynamically adjust position of the magnetic structure. Detailed configuration can be selected according to actual needs, and flexibility is strong.

Figure 8:
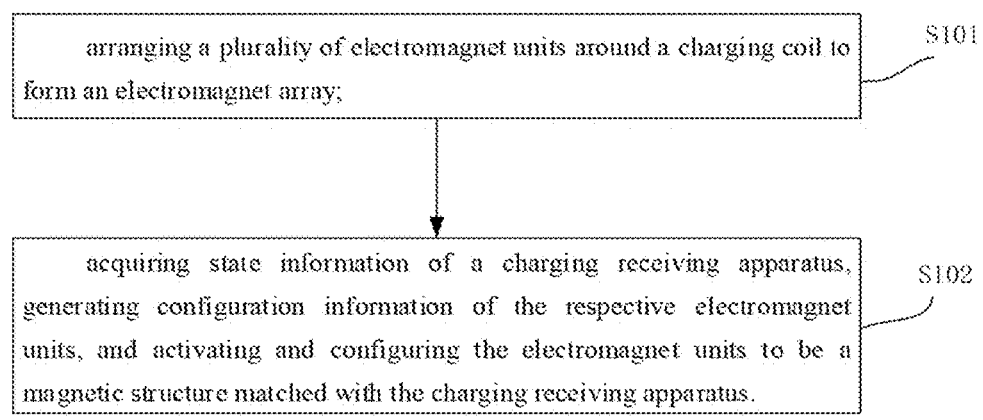
FIG. 8 is a flow diagram of a method for controlling charging through a wireless charging transmitting apparatus.

Referring to FIG. 8, FIG. 8 illustrates a flow diagram of a method for controlling charging through the wireless charging transmitting apparatus, comprising the steps of:

S101, arranging a plurality of electromagnet units around a charging coil to form an electromagnet array; and S102, acquiring state information of a charging receiving apparatus, generating configuration information of the respective electromagnet units, and activating and configuring the electromagnet units to be a magnetic structure matched with the charging receiving apparatus.

The state information of the charging receiving apparatus comprises at least one of quality information, position information, shape information, model information and magnetic information;

the configuration information of the electromagnet units is generated according to at least one of quality information, position information, shape information, model information and magnetic information.

In some embodiments, the position information is dynamic information; the magnetic structure is controlled to be fixed, and the position information of the charging receiving apparatus is dynamically adjusted according to the configuration information of the electromagnet units, such that the charging receiving apparatus moves towards the charging coil.

In some embodiments, the magnetic structure can be dynamically adjusted, such that the charging receiving apparatus moves towards the charging coil.

To sum up, with respect to the problem of incapable of compatibility and adaptability of the existing magnetic type wireless charging transmitting apparatus, the application provides a wireless charging transmitting apparatus compatible with any models of charging receiving apparatuses, the wireless charging transmitting apparatus forms an electromagnet array by arranging a plurality of electromagnet units 11 around a charging coil 131, and a control unit 12 generates configuration information of the respective electromagnet units according to the acquired state information of a charging receiving apparatus 20, and activates and configures the electromagnet units to be a magnetic structure matched with the charging receiving apparatus, i.e. generates information of polarities and magnetic field intensities of the electromagnet units according to at least one of quality information, position information, shape information, model information and magnetic information of the different charging receiving apparatuses, and can activate and configure the electromagnet units to be the magnetic structure matched with the charging receiving apparatus by reasonably configuring polarities and magnetic forces of the respective electromagnet units, so as to be effectively compatible with and adapted to various charging receiving apparatuses. The wireless charging transmitting apparatus can annularly or discretely distribute the electromagnet units around the charging coil which in an operating state, and dynamically adjust the position information of the charging receiving apparatus according to the configuration information of the electromagnet units, such that the charging receiving apparatus moves towards the charging coil, or hold relative position of the wireless charging apparatus and the charging receiving apparatus unchanged, and dynamically adjust position of the magnetic structure. Detailed configuration can be selected according to actual needs, and flexibility is strong.

The above descriptions and drawings only provide examples as the technical concept of the disclosure, and those ordinary in the art shall understand that without departing from essential features of the disclosure, various modifications and changes in form may be made to the embodiments described above, such as, combination, separation, substitution and change of the construction. Therefore, the embodiments disclosed in the disclosure do not aim to limit but describing the technical concept of the disclosure, so the scope of the technical concept of the disclosure is not limited. The scope of the disclosure shall be explained based on the appended claims, and all technical concepts included in the equivalent scope of the appended claims shall be explained to be included into the scope of the disclosure.

Of course, the invention may further have various other embodiments, and those skilled in the art shall make various corresponding modifications and variations to the invention without departing from spirit and essence of the invention, but these corresponding modifications and variations shall belong to the scope protected by the appended claims of the invention.

The application discloses A1. a wireless charging transmitting apparatus, comprising:

a charging module comprising a charging coil;

a plurality of electromagnet units arranged around the charging coil to form an electromagnet array; and a control unit for acquiring state information of a charging receiving apparatus, generating configuration information of the respective electromagnet units, and activating and configuring the electromagnet units to be a magnetic structure matched with the charging receiving apparatus, and the control unit controlling the charging module.

A2. the wireless charging transmitting apparatus according to A1,
the state information of the charging receiving apparatus comprises at least one of quality information, position information, shape information, model information and magnetic information;
the configuration information of the respective electromagnet units is generated according to at least one of quality information, position information, shape information, model information and magnetic information.

A3. the wireless charging transmitting apparatus according to A2,
the configuration information of the electromagnet units comprises information of polarities and magnetic field intensities of the electromagnet units.

A4. the wireless charging transmitting apparatus according to A2, wherein the control unit comprises:
a master control module for acquiring at least one of quality information, position information, shape information, model information and magnetic information of the charging receiving apparatus; and
an electromagnet array control module connected to the master control module for receiving at least one of quality information, position information, shape information, model information and magnetic information of the charging receiving apparatus, and activating and configuring the electromagnet units to be a magnetic structure matched with the charging receiving apparatus.

A5. the wireless charging transmitting apparatus according to any of A2 to A4,
the position information is dynamic information;
the magnetic structure is controlled to be fixed, and the position information of the charging receiving apparatus is dynamically adjusted according to the configuration information of the electromagnet units, such that the charging receiving apparatus moves towards the charging coil.

A6. the wireless charging transmitting apparatus according to any of A2 to A4,
the magnetic structure is dynamically adjusted, such that the charging receiving apparatus moves towards the charging coil.

A7. the wireless charging transmitting apparatus according to A5,
the activated electromagnet units are annularly arranged around the charging coil.

A8. the wireless charging transmitting apparatus according to A6,
the activated electromagnet units are discretely arranged around the charging coil.

A9. the wireless charging transmitting apparatus according to A1,
the charging coil is a plurality of coils or a single coil.

A10. the wireless charging transmitting apparatus according to A1,
the control unit acquires the state information of the charging receiving apparatus via wireless communication protocol or a dial switch or a man-machine interface.

The application further discloses B11. a method for controlling charging through a wireless charging transmitting apparatus, comprising:
arranging a plurality of electromagnet units around a charging coil to form an electromagnet array; and
acquiring state information of a charging receiving apparatus, generating configuration information of the respective electromagnet units, and activating and configuring the electromagnet units to be a magnetic structure matched with the charging receiving apparatus.

B12. The method according to B11,
the state information of the charging receiving apparatus comprises quality information, position information, and magnetic information;
the configuration information of the electromagnet units is generated according to at least one of quality information, position information, shape information, model information and magnetic information.

B13. The method according to B12,
the position information is dynamic information;
the method further comprises:
controlling the magnetic structure to be fixed, and dynamically adjusting the position information of the charging receiving apparatus according to the configuration information of the electromagnet units, such that the charging receiving apparatus moves towards the charging coil.

B14. The method according to B12,
dynamically adjusting the magnetic structure, such that the charging receiving apparatus moves towards the charging coil.

What is claimed is:

1. A wireless charging transmitting apparatus, comprising:
a charging module comprising a charging coil;
a plurality of electromagnet units arranged around the charging coil to form an electromagnet array; and
a control unit for acquiring state information of a charging receiving apparatus, generating configuration information of the respective electromagnet units, and activating and configuring the electromagnet units to be a magnetic structure matched with the charging receiving apparatus, and the control unit controlling the charging module.

2. The wireless charging transmitting apparatus according to claim 1, wherein,
the state information of the charging receiving apparatus comprises at least one of quality information, position information, shape information, model information and magnetic information;
the configuration information of the respective electromagnet units is generated according to at least one of quality information, position information, shape information, model information and magnetic information.

3. The wireless charging transmitting apparatus according to claim 2, wherein,
the configuration information of the electromagnet units comprises information of polarities and magnetic field intensities of the electromagnet units.

4. The wireless charging transmitting apparatus according to claim 2, wherein the control unit comprises:
a master control module for acquiring at least one of quality information, position information, shape information, model information and magnetic information of the charging receiving apparatus; and
an electromagnet array control module connected to the master control module for receiving at least one of quality information, position information, shape information, model information and magnetic information of the charging receiving apparatus, and activating and configuring the electromagnet units to be a magnetic structure matched with the charging receiving apparatus.

5. The wireless charging transmitting apparatus according to any of claim 2, wherein, the position information is dynamic information;

the magnetic structure is controlled to be fixed, and the position information of the charging receiving apparatus is dynamically adjusted according to the configuration information of the electromagnet units, such that the charging receiving apparatus moves towards the charging coil.

6. The wireless charging transmitting apparatus according to any of claim 2, wherein, the magnetic structure is dynamically adjusted, such that the charging receiving apparatus moves towards the charging coil.

7. The wireless charging transmitting apparatus according to claim 5, wherein, the activated electromagnet units are annularly arranged around the charging coil.

8. The wireless charging transmitting apparatus according to claim 6, wherein, the activated electromagnet units are discretely arranged around the charging coil.

9. The wireless charging transmitting apparatus according to claim 1, wherein, the charging coil is a plurality of coils or a single coil.

10. The wireless charging transmitting apparatus according to claim 1, wherein, the control unit acquires the state information of the charging receiving apparatus via wireless communication protocol or a dial switch or a man-machine interface.

11. A method for controlling charging through a wireless charging transmitting apparatus, comprising:

arranging a plurality of electromagnet units around a charging coil to form an electromagnet array; and acquiring state information of a charging receiving apparatus, generating configuration information of the respective electromagnet units, and activating and configuring the electromagnet units to be a magnetic structure matched with the charging receiving apparatus.

12. The method according to claim 11, wherein, the state information of the charging receiving apparatus comprises at least one of quality information, position information, shape information, model information and magnetic information;

the configuration information of the respective electromagnet units is generated according to at least one of quality information, position information, shape information, model information and magnetic information.

13. The method according to claim 12, wherein, the position information is dynamic information;

the method further comprises:

controlling the magnetic structure to be fixed, and dynamically adjusting the position information of the charging receiving apparatus according to the configuration information of the electromagnet units, such that the charging receiving apparatus moves towards the charging coil.

14. The method according to claim 12, wherein the method further comprises:

dynamically adjusting the magnetic structure, such that the charging receiving apparatus moves towards the charging coil.

* * * * *